(12) United States Patent
Angermeier et al.

(10) Patent No.: US 6,583,761 B1
(45) Date of Patent: Jun. 24, 2003

(54) METHOD AND DEVICE FOR DETERMINING A POSITION

(75) Inventors: Rüdiger Angermeier, Rimpar (DE); Ernst Schraud, Tauberbischofsheim (DE)

(73) Assignee: Geometrie Concern Verwaltungs - und Beteiligungsgesellschaft mbH (DE)

( * ) Notice: Subject to any disclaimer, the term of this patent is extended or adjusted under 35 U.S.C. 154(b) by 0 days.

(21) Appl. No.: 09/913,914
(22) PCT Filed: Feb. 9, 2000
(86) PCT No.: PCT/DE00/00382
§ 371 (c)(1), (2), (4) Date: Nov. 14, 2001
(87) PCT Pub. No.: WO00/49425
PCT Pub. Date: Aug. 24, 2000

(30) Foreign Application Priority Data

Feb. 19, 1999 (DE) .......................... 199 07 024

(51) Int. Cl.$^7$ ................................. G01S 5/04
(52) U.S. Cl. ......................... 342/432; 342/465
(58) Field of Search ................ 342/417, 465, 342/463, 445, 458, 126

(56) References Cited

U.S. PATENT DOCUMENTS

| 3,314,067 A | * | 4/1967 | Rutz ........................ 342/352 |
| 3,936,832 A | * | 2/1976 | Behnke ..................... 342/437 |
| 3,953,131 A | * | 4/1976 | Britz ......................... 356/141 |
| 4,099,879 A | | 7/1978 | Britz |
| 4,728,959 A | * | 3/1988 | Maloney et al. ............ 342/465 |
| 5,045,860 A | * | 9/1991 | Hodson ...................... 342/465 |
| 5,047,776 A | | 9/1991 | Baller |
| 5,075,696 A | * | 12/1991 | Wilby et al. ................ 342/432 |
| 5,227,803 A | | 7/1993 | O'Connor et al. |
| 5,319,188 A | | 6/1994 | Cole |
| 5,574,468 A | * | 11/1996 | Rose ......................... 342/442 |
| 5,719,584 A | * | 2/1998 | Otto .......................... 342/465 |

FOREIGN PATENT DOCUMENTS

| DE | 39 32 029 A1 | 6/1990 |
| DE | 42 09 077 A1 | 9/1993 |
| DE | 43 14 216 A1 | 11/1994 |
| DE | 196 47 098 A1 | 6/1998 |

* cited by examiner

Primary Examiner—Gregory C. Issing
(74) Attorney, Agent, or Firm—McGlew and Tuttle, P.C.

(57) ABSTRACT

A system and method is provided for determining the position of a transmitter/receiver device (13) arranged anywhere in a space in relation to at least two transmitter/receiver devices (11, 12) arranged at defined positions in the space with regard to each other. At least three transmitter/receiver devices (11, 12, 13), which each have an antenna device with a number of antenna units (20, 26, 27) distributed in a defined manner on a spherical surface (17) and a signal generating device, of which two transmitter/receiver devices (11, 12) are at least temporarily fixed in a local co-ordinate space (16). The other transmitter/receiver device (13) is movable relative to these devices.

9 Claims, 3 Drawing Sheets

METHOD AND DEVICE FOR DETERMINING A POSITION

FIELD OF THE INVENTION

The present invention relates to a method of position determination as well as a system for using the method and determining the position of a transmitter/receiver device arranged anywhere in a space in relation to at least two transmitter/receiver devices arranged at defined positions with regard to each other in the space. In addition, the present invention relates to a transmitter/receiver device for a position determination system.

BACKGROUND OF THE INVENTION

Methods of and devices for position determination, in which a directional or loop antenna is used and positioning takes place by way of orientation of the antenna towards a transmitter in dependence on the maximum received signal, are sufficiently familiar. With such methods or devices it is, however, necessary for a device to be provided, which carries out orientation or guiding of the directional antenna depending on the field strength of the received signal. As a result of the required mechanical equipment, such devices are not generally suitable for miniaturization.

In divergence from the aforementioned devices, which can still be implemented with relatively little apparatus, so-called "satellite positioning systems" are also known, which under the name of "Global Positioning Systems" (GPS) have now found their way into everyday applications, such as vehicle navigation systems.

However, these systems are characterized by enormous equipment requirements. Furthermore, GPS position determination systems are often not suitable for determining the position in enclosed spaces, in particular rooms with solid walls, such as concrete buildings or underground buildings.

U.S. Pat. No. 5,574,468 (Rose) discloses a system for determining the position of a target including a plurality of antennas in a phase comparison interferometer array, arranged in a conformal manner such that measurements are determined using a group of different baseline antennas. This kind of interferometer only operates in the emitters far field.

U.S. Pat. No. 5,045,860 (Hodson) discloses a system for determining position of a target in a target area with a plurality of fixed signal sensing stations, which are calibrated in reference to a reference direction, for example true or magnetic north, The object is determined by the intersection of the lines of bearing (LOB) within the target area. To minimize error the target area is divided into a grid of target area segments, whereby to each target area segment a partial probability value of a statistical error model is assigned.

U.S. Pat. No. 4,728,959 (Maloney) discloses a direction finding localization system for mobile radio transmitter within cellular telephone system with a number of fixed stations. The angle of arrival of the signal is measured at the fixed stations and the area in which all the direction angles cross is determined. The direction angle is determined by comparison of the difference in phase of the radio signal that is received by different antenna elements at a receiver site and is related to a reference direction.

U.S. Pat. No. 3,953,131 (Britz) discloses an optoelectronic antenna system with a plurality of transmitter/receiving devices, which are disposed over a prescribed geometrical surface, there are detectors coupled to the transmitter/receiving devices via glass fibre. Thus three-dimensional space scanning operations are possible. The antennas show different apertures depending on the position of the antenna. Thus the antenna system must be aligned to the earth gravitation field.

SUMMARY AND OBJECTS OF THE INVENTION

The aim of the present invention is to propose a method and a device suitable for implementing the method, allowing inertial system independent position determination with minimal requirements that can be easily miniaturized and is also usable within enclosed spaces.

The aim is realized by a method with the features including the procedural steps:

definition of a local co-ordinate space through the arrangement of at least two transmitter/receiver devices with a number of antenna units, arranged with a defined distribution on a spherical surface of the transmitter/receiver devices, in a space, in such a way that the transmitter/receiver devices are in defined relative positions at known horizontal and vertical distances, emission of a signal S1 via the antenna units of the first transmitter/receiver device and receiving of the signal S1 via the antenna units of the second transmitter/receiver device, determination of the distance vector between the first transmitter/receiver device and the second transmitter/receiver device through determining the antenna unit of the second transmitter/receiver device with the maximum receiving strength of the signal and emission of a signal S2 via the antenna units of the second transmitter/receiver device and receiving of the signal S2 via the antenna units of the first transmitter/receiver device as well as determination of the distance vector between the second transmitter/receiver device and the first transmitter/receiver device through determining the antenna unit of the first transmitter/receiver device with the maximum receiving strength of the signal, position determination of a third transmitter/receiver device arranged anywhere in the local co-ordinate space through emission of a signal S3 via the antenna units of the third transmitter/receiver device and receiving of the signal S3 via the antenna units of the first and second transmitter/receiver devices, determination of the antenna units of the first and second transmitter/receiver devices with the maximum receiving strength of the signal, determining the direction vectors between the first and the third transmitter/receiver device and the second and the third transmitter/receiver device, as well as determining the intersection of the direction vectors for determining the position of the third transmitter/receiver device.

The position determination system in accordance with the invention is for determining the position of a transmitter/receiver device arranged anywhere in a space in relation to at least two transmitter/receiver devices arranged at defined positions in the space with regard to each other. The system comprises at least three transmitter/receiver devices, with the transmitter/receiver devices each having an antenna system with a number of antenna units arranged with a defined distribution on a spherical surface and a signal generating device, with two transmitter/receiver devices being at least temporarily fixed in a local co-ordinate space and the other transmitter/receiver device being movable relative to the devices.

To construct the system a transmitter/receiver device may be used with a carrier device for arranging a number of antenna units of an antenna device on a spherical surface, a signal generating device and a processor device, whereby the signal generating device generates signals in dependence on the processor device, and the processor device through comparing the receiving strengths of the signals can determine the antenna unit of the antenna device with the maximum receiving strength.

The method of position determination according to the invention permits the inertial system-independent definition of a local co-ordinate system through two transmitter/receiver devices and the spatial position determination of a third transmitter/receiver device within the local co-ordinate space. In this way an exact position determination independent of an external system is possible, so that there are no limitations in the implementation of the method, as are present and have already been described in the case of the GPS.

As the method in accordance with the invention dispenses with the orientation of an antenna unit to a maximum signal strength, and instead uses a number of antenna units arranged on a spherical surface for defining a position signal, in that the antenna unit with the maximum receiving signal is detected, a simple and unchanged arrangement of the antenna units can be selected, whereby the mechanical structure of the system and the relevant transmitter/receiver device is considerably simplified and miniaturization can be easily carried out.

Various embodiments are conceivable for the transmitter/receiver devices used in the position determination system, depending on whether it is sufficient only to determine the position of a third transmitter/receiver device with regard to two transmitter/receiver devices arranged in a fixed manner in a space, or whether the third transmitter/receiver device is formed as an active mobile transmitter/receiver device, which actively determines the current position in order to be able to calculate a traveled path.

The method according to the invention, as well as a suitable system for implementing the method according to the invention using suitable transmitter/receiver devices, will be described in more detail below with the aid of the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
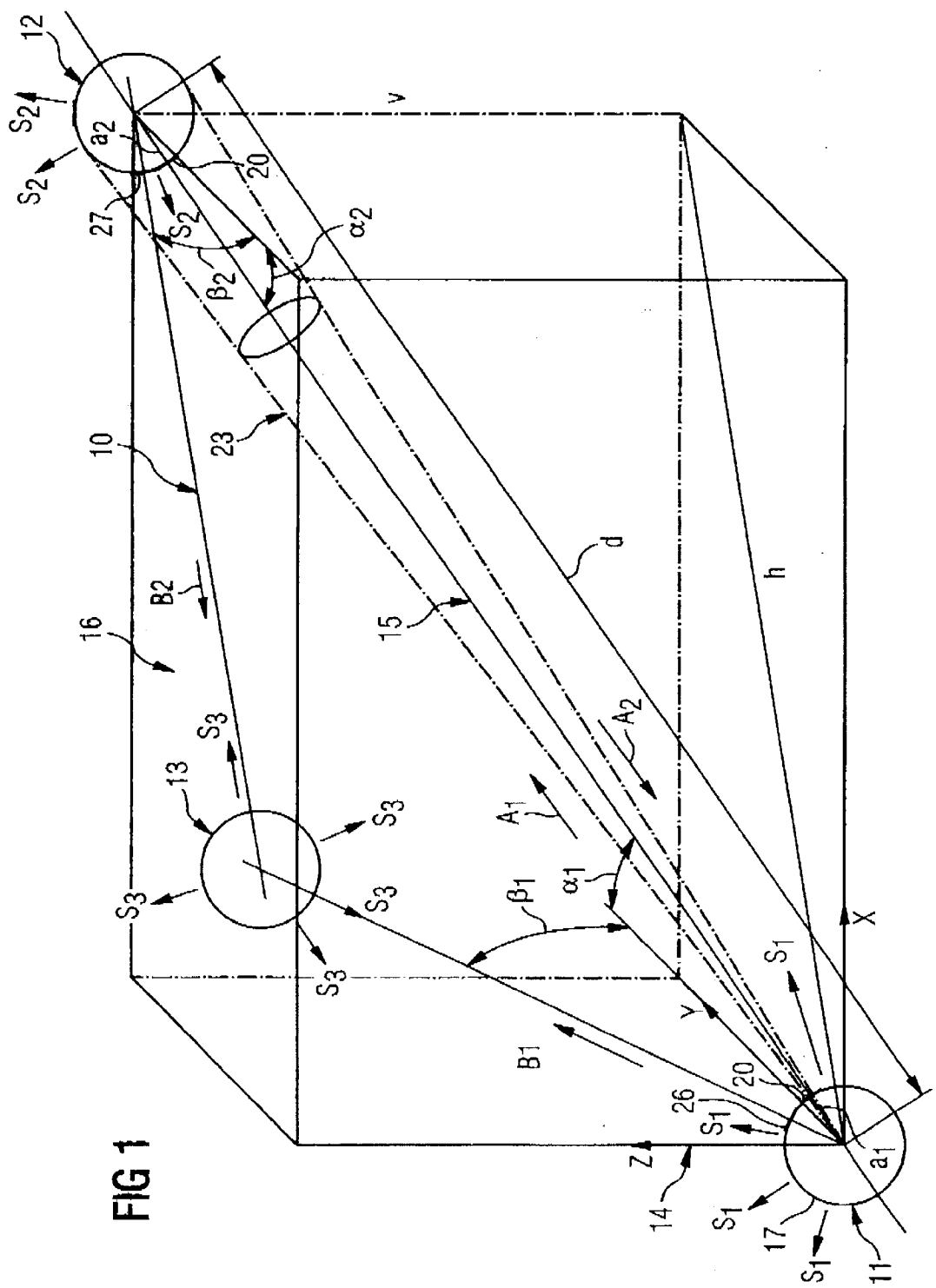
FIG. 1 is a view of a position determination system with three transmitter/receiver devices.

Referring to the drawings in particular, FIG. 1 shows a position determination system 10 with three transmitter/receiver devices 11, 12 and 13, which are arranged in a local co-ordinate system 14. The two transmitter/receiver devices 11 and 12 are arranged on a spatial diagonal 15 at a known distance d from each other, and in this case define corner points of a local co-ordinate space 16 that are diagonally opposite each other. The distance d is defined by the horizontal distance h and the vertical distance v of the transmitter/receiver devices 11 and 12 from each other.

Figure 2:
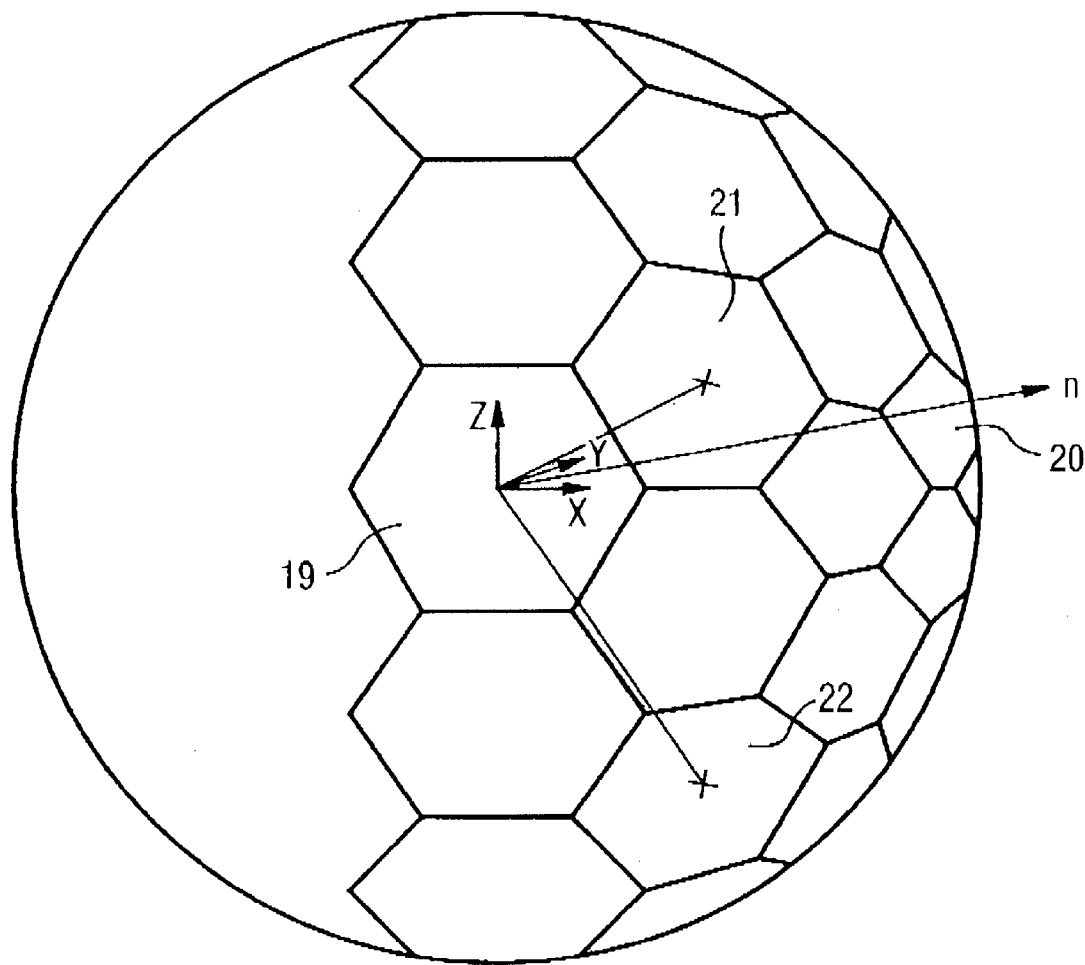
FIG. 2 is a front view of a transmitter/receiver device.

In the method of determining the position of the transmitter/receiver device 13 arranged anywhere in the co-ordinate space 16 by means of the position determination system 10 shown in FIG. 1, the co-ordinate space 16 is initially defined by the position of the transmitter/receiver devices 11, and 12. For this a signal S1 is emitted by an antenna device 18 arranged on a spherical surface 17 of the transmitter/receiver device 11 which antenna device has a number of antenna units 19 to 22 (FIG. 2). Because of the spherical surface 17 of the antenna device 18, signal S1 is emitted evenly into the space surrounding the spherical surface 17, so that within a signal cone 23 emitted from the transmitter/receiver device 11, signal S1 also hits the spherical surface 17 of transmitter/receiver device 12. Depending on the surface angle with which the signal S1 hits the spherical surface 17 or the antenna units 19 to 22 distributed on the spherical surface 17 (FIG. 2), signal S1 is received with a different signal strength by the antenna units 19 to 22. The maximum signal strength is present when the signal hits the surface of the antenna units 19 to 22 parallel to the planar norm n (FIG. 2). The maximum receiving signal defines the antenna unit 20 of the transmitter/receiver device 12 arranged on the spatial diagonal 15. Correspondingly, namely through the emission of a second signal S2 from the antenna device 18 of the transmitter/receiver device 12, the antenna unit 20 of the transmitter/receiver device 11 with the maximum receiving strength can be determined, which also lies on the spatial diagonal 15. Via the two antenna units 20, which are arranged on the joint spatial diagonal 15, the position of the transmitter/receiver devices 11 and 12, arranged at fixed positions in the co-ordinate space 16, is defined with regard to each other. By means of the distance values h and v, defined, for example, by geodetic measurement, the distance vectors $\ddot{A}_1$ and $\ddot{A}_2$ between the transmitter/receiver devices 11 and 12 can be determined.

Figure 3:
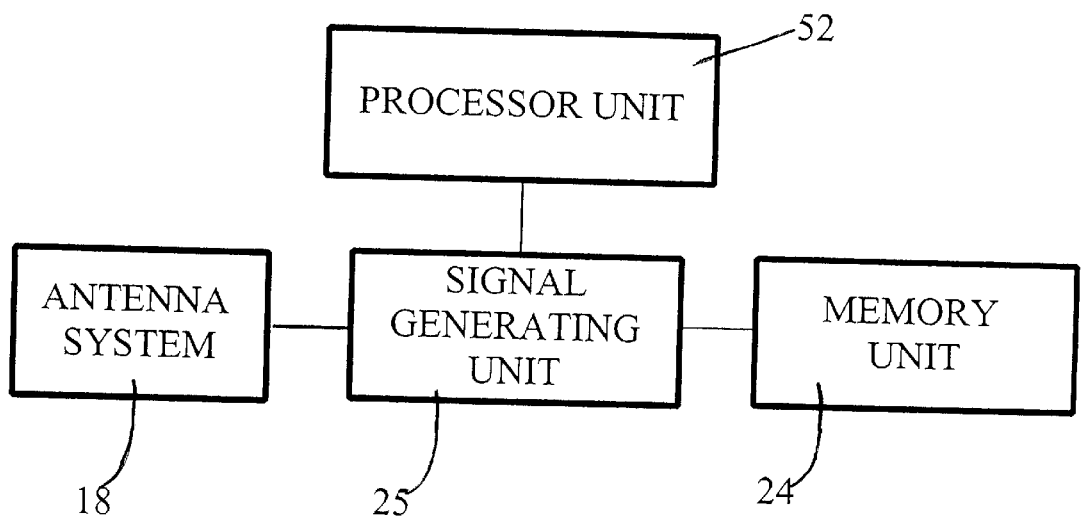
FIG. 3 is a functional diagram of a transmitter/receiver device.

The distance vector $\ddot{A}_1$, and the distance vector, $\ddot{A}_2$ define the relative position and distance of the transmitter/receiver devices 11 and 12 and corresponding zero or reference directions $a_1$, and $a_2$ for both transmitter/receiver devices 11 and 12. These reference directions $a_1$, and $a_2$ as well as the distance d between the transmitter/receiver devices 11 and 12 are saved in a memory device 24 (FIG. 3) of each transmitter/receiver device 11, 12.

In addition to the transmitter/receiver devices 11 and 12 arranged in a fixed manner in the space the position determination system 10 shown, in FIG. 1 comprises transmitter/receiver device 13 that is arranged anywhere and in a stationary position in the space 16. Like transmitter/receiver devices 11, 12, transmitter/receiver device 13 has an antenna device 18 with a number of antenna units 19 to 22 arranged on a spherical surface 17. In addition, in the same way as transmitter/receiver devices 11, 12, transmitter/receiver device 13 is provided with a signal generating device 25 (FIG. 3), so that a signal S3 can be evenly emitted into the surrounding space from the spherical surface 17 of transmitter/receiver device 13. In accordance with the above relationships already explained in detail, a certain antenna unit 26 or 27 is defined in transmitter/receiver devices to 11, 12 depending on the maximum receiving strength of the signal from the direction of signal S3. From the known relative position of the antenna unit 20 with regard to the zero or reference directions $a_1$, and $a_2$ of transmitter/receiver devices 11, 12 and antenna units 26 and 27, a processor device 52 in the transmitter/receiver devices 11, 12 calculates the respective position angles $\alpha_1$, $\beta_1$ and $\alpha_2$, $\beta_2$. In this way the direction vectors $B_1$ and $B_2$ are known, the intersection of which determines the position of the third transmitter/receiver device 13.

From the above description it is clear that the transmitter/receiver device 13 can also be designed solely as a transmitter device in order to be able to determine the position of the device. On the other hand if device 13 is to be an active device, which, for example, depending on the traveled path triggers certain functions as a guide device, it is necessary not only to design the device 13 as a transmitter device but also as a receiver device in order to obtain information from devices 11 and 12 about the current position, and depending on these to emit appropriate signals for triggering functions.

The position determination system 10 shown as an example in FIG. 1 can in addition to the transmitter/receiver devices 11 and 12, also be supplemented with further transmitter/receiver units which also serve to define the co-ordinate space 16. Through such over-definition of the coordinate space 16 the precision of the positioning of transmitter/receiver unit 13 can be increased on the one hand. On the other hand any functional errors of one or possible more transmitter/receiver devices can be offset.

Figure 4:
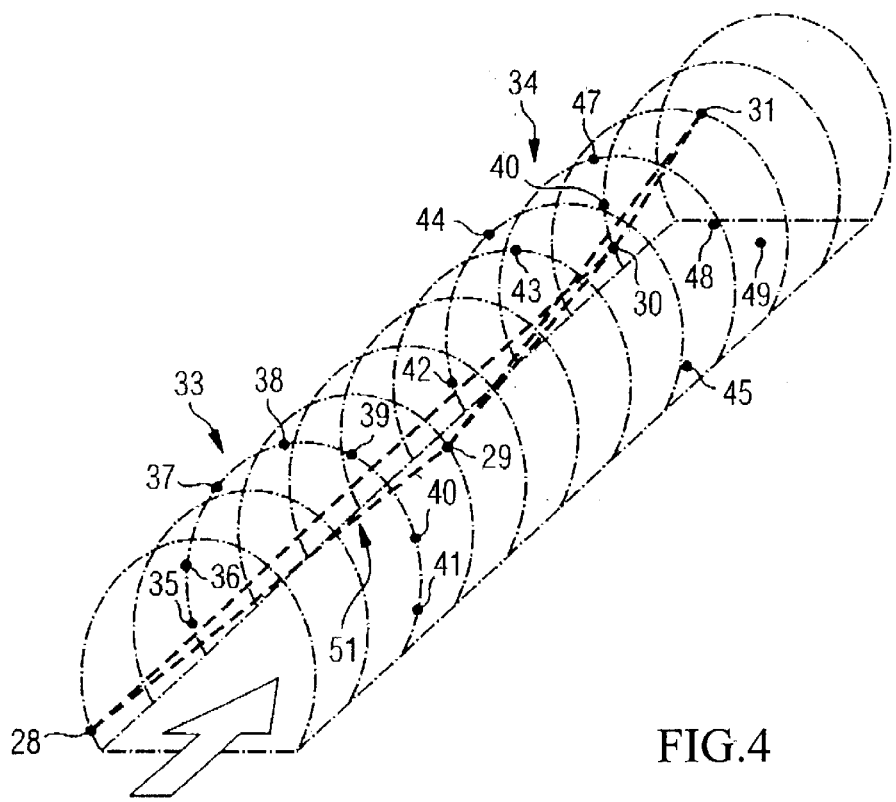
FIG. 4 is a diagram showing the use of a position determination system in tunnel construction.

FIG. 4 shows an example of the use of a position determination system in tunnel construction. For this various sections of a tunnel 32 are shown. The reference system 51, defined here by a total of four fixed devices 28,29,30 and 31 and which in accordance with the simplified principle diagram in FIG. 1 defines the local co-ordinate space, extends in the longitudinal direction of the tunnel 32. In addition there are two systems 33, 34 each with seven devices 35 to 41 and 42 to 48 in the tunnel 32. Furthermore a mobile device 49 is envisaged. Devices 35 to 41 can be designed as pure transmitter devices or also as transmitter/receiver devices and are used to determine deformations in the area of a tunnel cross section 50 by checking or recording the position changes of the individual devices. The same applies to devices 42 to 48, which not only record deformations in the tunnel profile, but also relative deviations in the tunnel direction. The mobile device 49 on the other hand is designed as a transmitter/receiver device and is arranged, for example, on a mobile command unit which can be moved in the tunnel 32, which in turn forwards commands to various working devices, such as a drill mount etc.

While specific embodiments of the invention have been shown and described in detail to illustrate the application of the principles of the invention, it will be understood that the invention may be embodied otherwise without departing from such principles.

What is claimed is:

1. A method of position determination in a space, the method comprising the steps of:
    defining a local co-ordinate space through the arrangement of at least two transmitter/receiver devices with a number of antenna units arranged with a defined distribution on a spherical surface of the transmitter/receiver devices, in a space, in such a way that the transmitter/receiver devices are in defined relative positions at known horizontal distance h and vertical distance v;
    emitting a signal S1 via the antenna units of the first transmitter/receiver device and receiving of the signal S1 via the antenna units of the second transmitter/receiver device and determining the distance vector A, between the first transmitter/receiver device and the second transmitter/receiver device through a determination of the antenna unit of the second transmitter/receiver device with the maximum receiving strength of the signal S1 and emission of a signal S2 via the antenna units of the second transmitter/receiver as well as a determination of the distance vector A, between the second and the first transmitter/receiver device through a determination of the antenna unit of the first transmitter/receiver device with maximum receiving strength of the signal S2;
    determining the position of a third transmitter/receiver device arranged anywhere in the local co-ordinate space through emission of a signal S3 via the antenna units of the third transmitter/receiver device and receiving of the signal S3 via the antenna units of the first and second transmitter/receiver devices and determining the antenna units of the first transmitter/receiver device and the second transmitter/receiver device with maximum receiving strength of the signal S3, determining the direction vectors $B_1$ and $B_2$ as well as determining the intersection of the direction vectors for determining the position of the third transmitter/receiver device.

2. A transmitter receiver device for a system of position determination in a space that is independent of an external inertial system according to claim 1, comprising:
    at least three transmitter/receiver devices each having an antenna system with a number of antenna units arranged with a defined distribution on a spherical surface and a signal generating unit, two of said at least three transmitter/receiver devices being at least temporarily fixed in a local co-ordinate space and the other of said at least three transmitter/receiver device being movable relative to the devices.

3. A transmitter/receiver device for a system for position determination in a space according to claim 2, the device comprising:
    a carrier device for the arrangement of a number of equally spaced antenna units on a spherical surface;
    a signal generating device; and
    a processor unit, whereby the signal generating device produces signals in dependence on the processor unit.

4. The transmitter/receiver device according to claim 3, wherein said processor unit is used to identify an antenna unit of the transmitter/receiver device by comparing the receiving strength of the signals S1, S2 S3 received by the antenna units.

5. A system comprising:
    a local co-ordinate space defined through the arrangement of a first transmitter/receiver device and a second first transmitter/receiver device, each with a number of antenna units arranged with a defined distribution on a spherical surface of the transmitter/receiver device, in a space with the transmitter/receiver devices at defined relative positions at known horizontal distance and vertical distance;
    a first transmitter/receiver device signal sent via the antenna units of the first transmitter/receiver device, the first transmitter/receiver device signal being received via the antenna units of the second transmitter/receiver device;
    a processor for determining a distance vector between the first transmitter/receiver device and the second transmitter/receiver device through a determination of the antenna unit of the second transmitter/receiver device with the maximum receiving strength of the first transmitter/receiver device signal;

a second transmitter/receiver signal sent via the antenna units of the second transmitter/receiver device, the second transmitter/receiver device signal being received via the antenna units of the first transmitter/receiver device;

the processor determining the distance vector between the second transmitter/receiver device and the first transmitter/receiver device through determining the antenna unit of the first transmitter/receiver device with maximum receiving strength of the second transmitter/receiver signal;

a third transmitter/receiver signal sent via antenna units of a third transmitter/receiver device and the third transmitter/receiver signal being received by the antenna units of the first transmitter/receiver device and the antenna units of the second transmitter/receiver device;

the processor determining the position of the third transmitter/receiver device arranged anywhere in the local co-ordinate space by determining the antenna units of the first transmitter/receiver device and the second transmitter/receiver device with maximum receiving strength of the third transmitter/receiver signal and determining a first direction vector from the first transmitter/receiver device to the third transmitter/receiver device and a second direction vector from the second transmitter/receiver device to the third transmitter/receiver device and determining an intersection of the first direction vector and the second direction vector to determine the position of the third transmitter/receiver device.

6. A system according to claim 5, wherein each of said first transmitter/receiver device, said second transmitter/receiver device and said third transmitter/receiver device have an antenna system with a number of antenna units arranged with a defined distribution on a spherical surface and a signal generating unit, said third transmitter/receiver device being movable relative to said first transmitter/receiver device and said second transmitter/receiver device.

7. A system according to claim 5, wherein each of said first transmitter/receiver device, said second transmitter/receiver device and said third transmitter/receiver device each comprise:

a carrier device for the arrangement of a number of equally spaced antenna units on a spherical surface;

a signal generating device; and a processor unit, whereby the signal generating device produces signals in dependence on the processor unit.

8. A system according to claim 5, wherein said processor unit is used to identify an antenna unit of the antenna device by comparing the receiving strength of the first transmitter/receiver signal, the second transmitter/receiver signal and the third transmitter/receiver signal received by the antenna units.

9. A system with a local co-ordinate space defined through the arrangement of a fixed first transmitter/receiver device and a fixed second first transmitter/receiver device, each with a number of antenna units arranged with a defined distribution on a spherical surface of the transmitter/receiver device, in a space with the transmitter/receiver devices at defined relative positions at known horizontal distance and vertical distance and a third transmitter/receiver device that has a position to be determined, each transmitter/receiver device comprising:

a carrier device for the arrangement of a number of equally spaced antenna units on a spherical surface;

a signal generating device; and a processor unit, whereby the signal generating device produces signals in dependence on the processor unit.

* * * * *